United States Patent
Ueki et al.

(10) Patent No.: US 6,744,523 B2
(45) Date of Patent: Jun. 1, 2004

(54) IMAGING OPTICAL SYSTEM FOR OBLIQUE INCIDENCE INTERFEROMETER

(75) Inventors: Nobuaki Ueki, Saitama (JP); Hideo Kanda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 86 days.

(21) Appl. No.: 10/105,371

(22) Filed: Mar. 26, 2002

(65) Prior Publication Data

US 2002/0140944 A1 Oct. 3, 2002

(30) Foreign Application Priority Data

Mar. 30, 2001 (JP) ........................................ 2001-099010

(51) Int. Cl.[7] ................................................ G01B 9/02
(52) U.S. Cl. ...................................................... 356/512
(58) Field of Search ................................ 356/511, 512, 356/513, 514, 521

(56) References Cited

U.S. PATENT DOCUMENTS 6,249,351 B1 * 6/2001 de Groot .................... 356/512

* cited by examiner

Primary Examiner—Samuel A. Turner
Assistant Examiner—Michael A. Lyons
(74) Attorney, Agent, or Firm—Snider & Associates; Ronald R. Snider

(57) ABSTRACT

An imaging optical system for an oblique incidence interferometer comprises first and second optical systems and an intermediate imaging surface therebetween. Each of the first and second imaging optical systems comprises two telecentric lenses, arranged afocal to each other, having respective focal lengths different from each other. A first image of a surface to be inspected having a deformed aspect ratio with respect to this surface is formed on the intermediate imaging surface by way of the first imaging optical system. The second imaging optical system is arranged such that the first image is focused onto the imaging surface of the interferometer as a second image corrected so as to have substantially the same aspect ratio as that of the surface to be inspected.

6 Claims, 5 Drawing Sheets

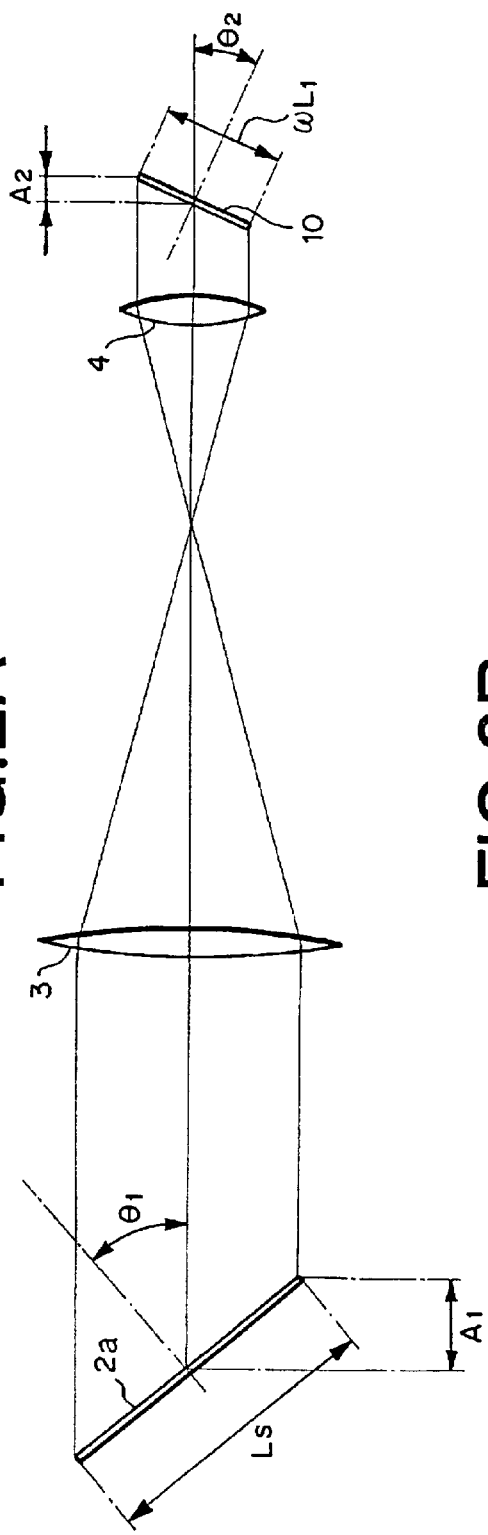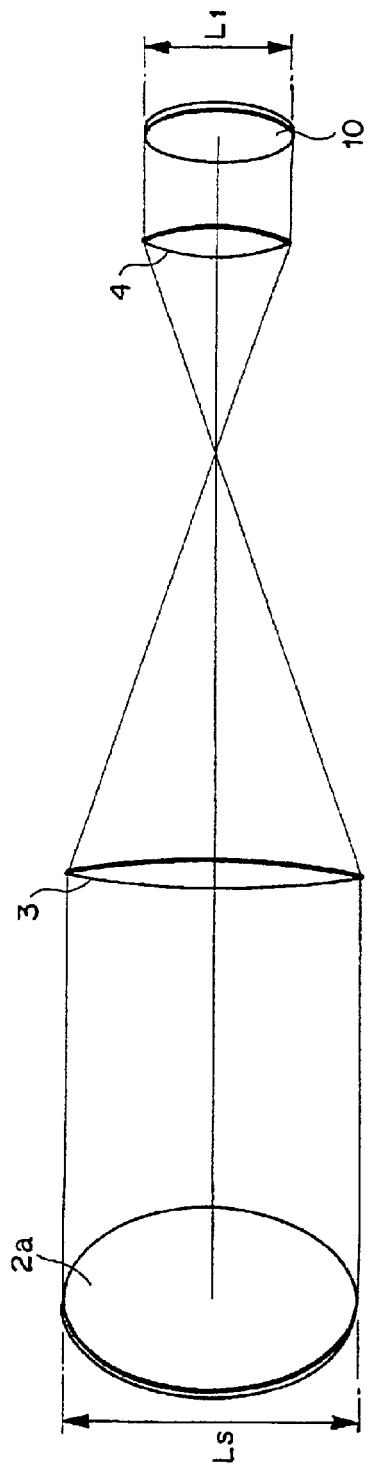
FIG.2A
FIG.2B

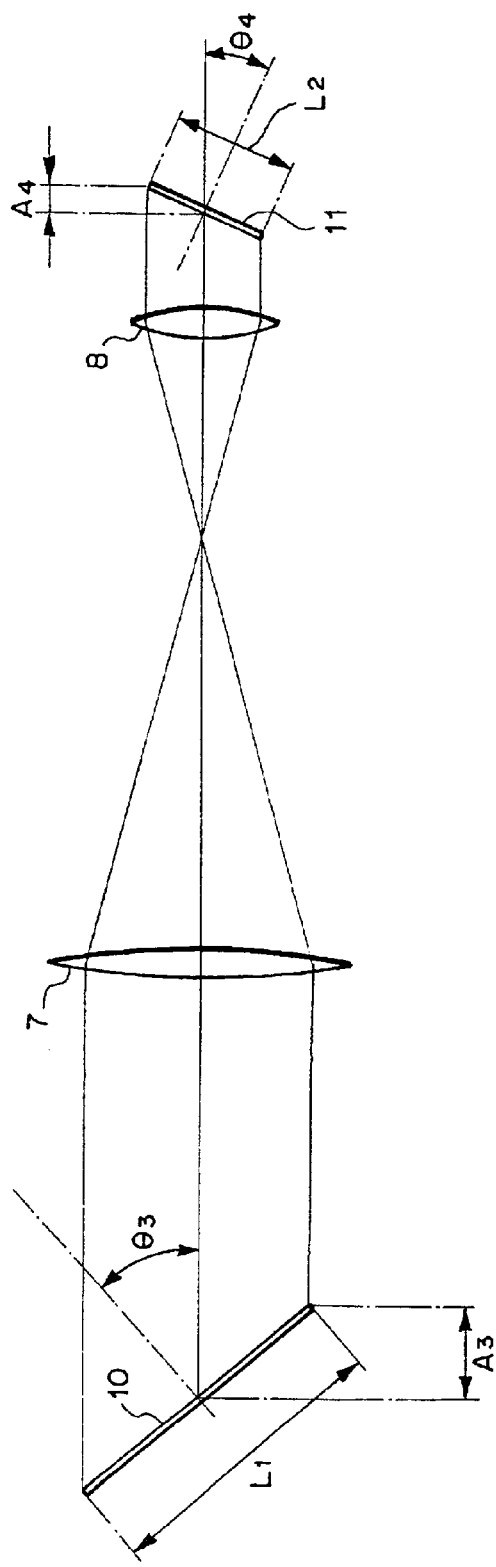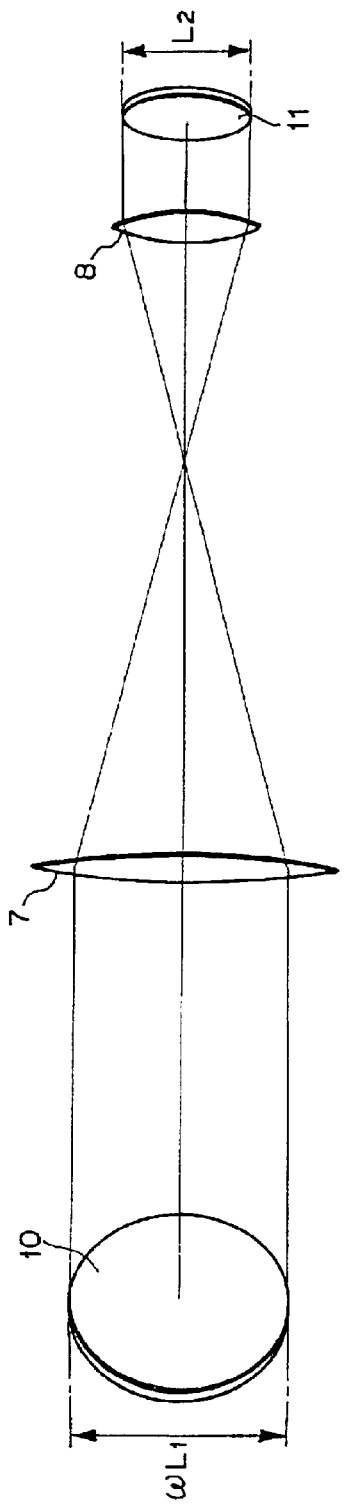

IMAGING OPTICAL SYSTEM FOR OBLIQUE INCIDENCE INTERFEROMETER

RELATED APPLICATIONS

This application claims the priority of Japanese Patent Application No. 2001-99010 filed on Mar. 30, 2001, which is incorporated herein by reference.

BACKGROUND OF THE INVENTION

1. Field of the Invention

The present invention relates to an imaging optical system for an oblique incidence interferometer; and, more specifically, to an imaging optical system, disposed between a surface to be inspected and an imaging surface constituted by an image pickup device, for forming an image of the surface to be inspected having interference fringes superposed thereon onto the imaging surface.

2. Description of the Prior Art

Oblique incidence interferometers have conventionally been known, in which coherent light is made obliquely incident on a surface to be inspected, so as to lower the sensitivity in measurement, thereby making it possible to measure the surface form having a relatively large degree of irregularities. Known as a typical configuration of the oblique incidence interferometers is one shown in FIG. 4, for example.

This oblique incidence interferometer is configured such that coherent light is made incident on a wavefront splitting means 102. The wavefront of incident light is split into two directions. One of the resulting luminous fluxes is made obliquely incident on a surface to be inspected 2a, so as to become measurement light reflected thereby, whereas the other luminous flux is used as reference light. The measurement light and reference light are made incident on a wavefront combining means 104 so that their wavefronts are combined together. Interference fringes generated by the optical interference between the measurement light and reference light emitted in the same direction from the wavefront combining means 104 are captured by a video camera 108 by way of an imaging lens 106, and the form of the surface to be inspected 2a is measured according to thus obtained interference fringe image.

In such an oblique incidence interferometer, however, the optical path length to the imaging lens 106 varies depending on positions on the surface to be inspected 2a, so that trapezoidal distortions may occur in the interference fringe image captured by the video camera 108, whereby the form of the surface to be inspected 2a may not be measured accurately. Though it is possible to eliminate trapezoidal distortions by electronic image processing, arithmetic operations for compensating for the resolution of image pickup device are complicated, and requirements for tolerances for apparatus become severer, whereby this approach is unfavorable.

Known as an oblique incidence interferometer solving such a problem is one shown in FIG. 5. This apparatus is configured such that, an interference fringe viewing screen 110 is disposed at a position conjugate with a surface to be inspected 2a, whereas interference fringes superposed on the image of the surface to be inspected formed on the interference fringe viewing screen 110 are captured by a video camera 108 arranged perpendicular to the screen 110. In this drawing, an imaging lens 106 is disposed such that its first focal point is positioned at the surface to be inspected 2a, a collimator lens 112 is arranged afocal with respect to the imaging lens 106, and the interference fringe viewing screen 110 is disposed at a second focal position of the collimator lens 112. Such a configuration makes it possible to form an image of the surface to be inspected having the same size as the surface to be inspected with substantially the same longitudinal and lateral magnifications with respect to the surface to be inspected, whereby trapezoidal distortions of the image are prevented from occurring.

Employing such a configuration, however, may be problematic in that the total length of the interferometer increases. Since the interference fringe viewing screen 110 is disposed at the position conjugate with the surface to be inspected 2a with respect to the imaging lens 106 and collimator lens 112, the screen 110 must have the same size as that of the surface 2a, which may hinder the apparatus from being made compact, though trapezoidal distortions of the image of the surface to be inspected are prevented from occurring.

Therefore, imaging optical systems of oblique incidence interferometers have been desired to be able to capture images of interference fringes without trapezoidal distortions, and reduce the screen size, so that the apparatus can be made smaller. Here, the image of surface to be inspected having interference fringes superposed thereon to be captured is desired to be an in-focus image having substantially the same longitudinal and lateral magnifications with respect to the surface to be inspected, which is not required to be corrected by arithmetic operations.

SUMMARY OF THE INVENTION

In order to overcome such a problem, it is an object of the present invention to provide an imaging optical system for an oblique incidence interferometer, which can form an image of a surface to be inspected having substantially the same longitudinal and lateral magnifications with respect to the surface to be inspected onto an imaging surface while being able to reduce the size of the apparatus.

The present invention provides an imaging optical system for an oblique incidence interferometer in which a part of light source light is turned into parallel light so as to become measurement light obliquely incident on a surface to be inspected in a sample, a part of the remainder of the light source light is used as reference light constituted by parallel light, and the measurement light and the reference light are combined together and caused to interfere with each other so as to superpose interference fringes onto an image of the surface to be inspected formed on an imaging surface;

the imaging optical system comprising:
   a first imaging optical system comprising two groups of telecentric lenses $G_1$, $G_2$ having respective focal lengths different from each other, the telecentric lens $G_1$ having a longer focal length and the telecentric lens $G_2$ having a shorter focal length being arranged afocal to each other successively from the surface to be inspected side;
   an intermediate imaging surface; and
   a second imaging optical system comprising two groups of telecentric lenses $G_3$, $G_4$ having respective focal lengths different from each other, the telecentric lens $G_3$ having a longer focal length and the telecentric lens $G_4$ having a shorter focal length being arranged afocal to each other successively from the surface to be inspected side;
   wherein a first image of the surface to be inspected, reduced from the surface to be inspected, having a deformed aspect ratio with respect to the surface to be inspected is formed on the intermediate imaging surface by the combined light of the measurement light and reference light by way of the first imaging optical system; and wherein the second imaging optical system is arranged with respect to the intermediate imaging surface such that the first image of the surface to be inspected is focused by the second imaging optical system onto the imaging surface as a second image of the surface to be inspected which is reduced from the first image of the surface to be inspected and corrected so as to have substantially the same aspect ratio as that of the surface to be inspected.

The second imaging optical system may form on the imaging surface an image of the surface to be inspected caused by scattered light transmitted through the intermediate imaging surface.

The second imaging optical system may form on the imaging surface an image of the surface to be inspected caused by scattered light reflected by the intermediate imaging surface.

Preferably, the imaging optical system satisfies the following conditional expressions (1) to (3):

$$\tan \theta_2 = \beta_1 \tan \theta_1 \quad (1)$$

$$\tan \theta_4 = \beta_2 \tan \theta_3 \quad (2)$$

$$\cos \theta_1 / \cos \theta_2 = \cos \theta_3 / \cos \theta_4 \quad (3)$$

where $\theta_1$ is the angle formed between a normal of the surface to be inspected and the optical axis of the first imaging optical system;

$\theta_2$ is the angle formed between a normal of the intermediate imaging surface and the optical axis of the first imaging optical system;

$\theta_3$ is the angle formed between the normal of the intermediate imaging surface and the optical axis of the second imaging optical system;

$\theta_4$ is the angle formed between a normal of the imaging surface and the optical axis of the second imaging optical system;

$\beta_1$ is the absolute value of magnification of the first imaging optical system; and $\beta_2$ is the absolute value of magnification of the second imaging optical system.

Preferably, the intermediate imaging surface is constituted by a diffuser rotating with a center of rotation located on the intermediate imaging surface or an extended plane thereof.

The diffuser may be a ground glass sheet, a holographic screen, or a liquid crystal screen using a dynamical scattering mode.

BRIEF DESCRIPTION OF THE DRAWINGS

FIGS. 2A and 2B are views for explaining a reducing relationship between a surface to be inspected and an image of the surface to be inspected on a screen in a first imaging optical system;

FIGS. 3A and 3B are views for explaining a reducing relationship between a surface to be inspected and an image of the surface to be inspected on a screen in a second imaging optical system;

DESCRIPTION OF THE PREFERRED EMBODIMENTS

Figure 1:
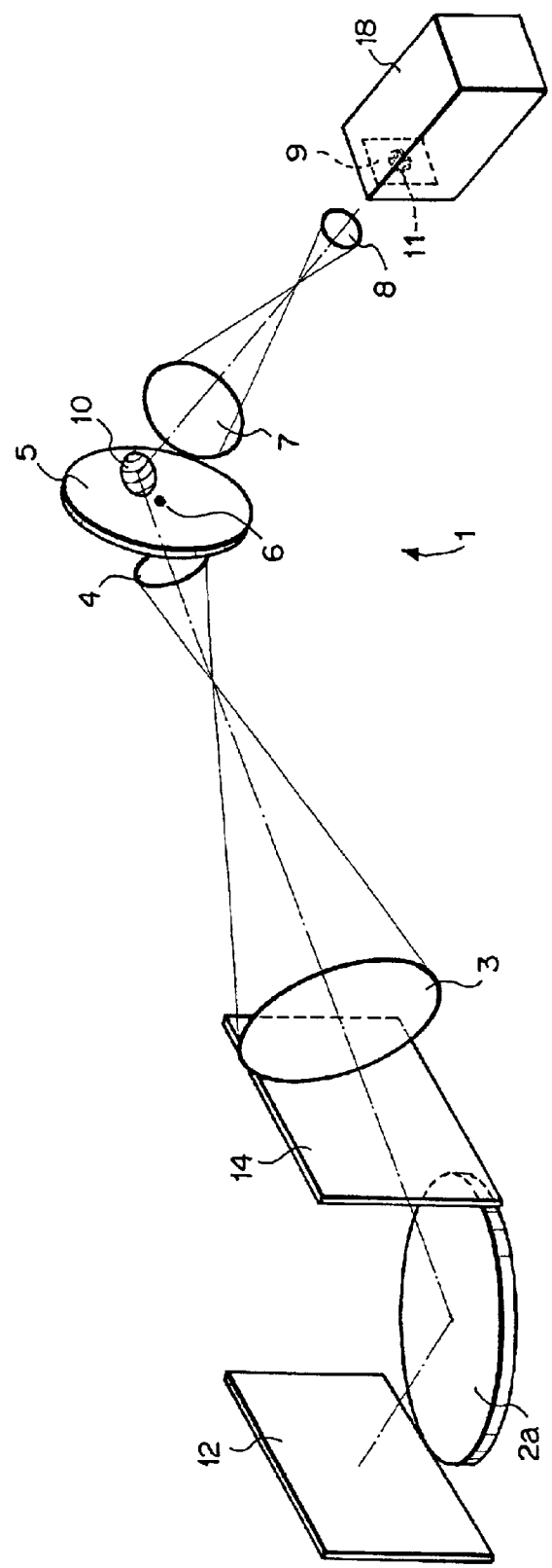
FIG. 1 is a view schematically showing the configuration of an imaging optical system for an oblique incidence interferometer in accordance with the present invention.
Figure 4:
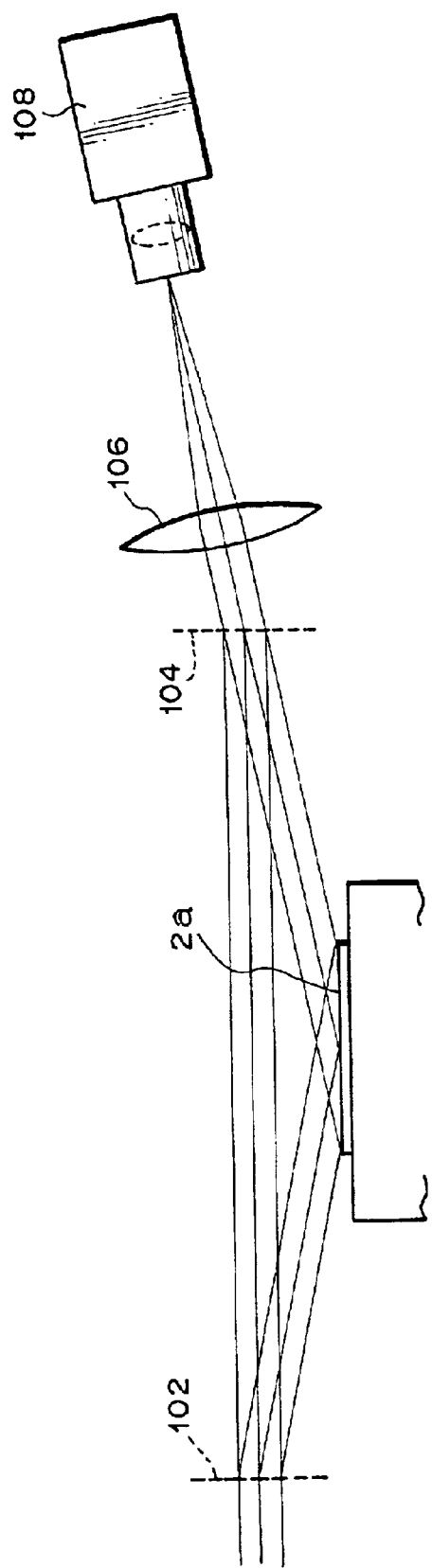
FIG. 4 is a schematic view showing the configuration of a conventional oblique incidence interferometer.

In the following, an embodiment of the present invention will be explained in detail with reference to the drawings. FIG. 1 is a view schematically showing the configuration of an imaging optical system for an oblique incidence interferometer in accordance with the present invention.

In this oblique incidence interferometer, coherent light emitted from a light source is turned into a parallel luminous flux by a collimator lens. The parallel luminous flux is made incident on a wavefront splitting means 12, so that its wavefront is split into two directions. One of the resulting luminous fluxes is made obliquely incident on a surface to be inspected 2a so as to become measurement light reflected thereby, whereas the other luminous flux is used as reference light. The measurement light and reference light are made incident on a wavefront combining means 14, so that their wavefronts are combined together. Interference fringes generated upon the optical interference between the measurement light and reference light emitted into the same direction from the wavefront combining means 14 are superposed onto the image of the surface to be inspected formed on an imaging surface 9 by way of an imaging optical system 1 in accordance with the present invention and are captured by a video camera 18. According to thus obtained interference fringe image, the form of the surface to be inspected 2a is measured.

In FIG. 1, each of the wavefront splitting means 12 and wavefront combining means 14 uses a diffraction grating. The incident parallel luminous flux is diffracted by the wavefront splitting means 12. For example, the +first-order light component of thus diffracted light is reflected by the surface to be inspected 2a, and thus reflected +first-order light component and the zero-order light component transmitted through the wavefront splitting means 12 are superposed on each other by the wavefront combining means 14 so as to interfere with each other.

As depicted, the imaging optical system 1 for an oblique incidence interferometer in accordance with the present invention comprises a first imaging optical system composed of two telecentric lenses 3, 4 having respective focal lengths different from each other, in which the lens 3 having a longer focal length and the lens 4 having a shorter focal length are arranged afocal to each other successively from the surface to be inspected side; a screen 5 acting as an intermediate imaging surface; and a second imaging optical system composed of two telecentric lenses 7, 8 having respective focal lengths different from each other, in which the lens 7 having a longer focal length and the lens 8 having a shorter focal length are arranged afocal to each other successively from the surface to be inspected side.

The combined light of measurement light and reference light emitted from the wavefront combining means 14 forms an image 10 of the surface to be inspected 2a onto the screen 5 by way of the first imaging optical system, whereas interference fringes are superposed on this image 10. Since the focal length of the lens 4 is shorter than that of the lens 3, the first imaging optical system acts as a reduction imaging optical system. Since the surface to be inspected 2a is arranged with a predetermined angle with respect to the optical axis of the first imaging optical system, the screen 5 is also arranged with a predetermined angle with respect to the optical axis of the first imaging optical system such that the image 10 formed thereon is in focus. As a consequence, the first image 10, reduced from the surface to be inspected 2a, having a predetermined deformed aspect ratio with respect to the surface to be inspected 2a is formed on the screen 5.

The image 10, formed on the screen 5, having interference fringes superposed thereon is focused again onto the imaging surface 9 by way of the second imaging optical system, so as to be captured. Since the focal length of the lens 8 is shorter than that of the lens 7, the second imaging optical system also acts as a reduction imaging optical system. The second imaging optical system is arranged with a predetermined angle with respect to the screen 5 such that an image 11 of the surface to be inspected formed on the imaging surface 9 by the second imaging optical system is reduced from the image 10 on the screen 5 and has substantially the same aspect ratio as that of the surface to be inspected 2a. The imaging surface 9 is arranged with a predetermined angle with respect to the optical axis of the second imaging optical system, whereby the image 11, reduced from the image 10, having a predetermined deformed aspect ratio with respect to the image 10 is formed as an in-focus image on the imaging surface 9, so as to be captured.

Namely, in the imaging optical system of this embodiment, the first image 10, reduced from the surface to be inspected 2a, having a predetermined deformed aspect ratio with respect to the surface to be inspected 2a is formed on the screen 5 by the first imaging optical system, whereas the second imaging optical system is arranged with respect to the screen 5 so as to correct this predetermined deformed aspect ratio, whereby the image 11 reduced from the image 10 on the screen 5 and corrected so as to have substantially the same aspect ratio as that of the surface to be inspected 2a is formed on the imaging surface 9, so as to be captured.

Since the image 10 formed on the screen 5 is reduced from the size of the surface to be inspected, the screen 5 can be made smaller, and the image 11 having substantially the same longitudinal and lateral magnifications with respect to the surface to be inspected 2a can be formed on the imaging surface 9 according to the imaging optical system of this embodiment. Since the lens 4 and screen 5 can be made smaller while the distance between the lenses 3 and 4 can be shortened, the apparatus can be made smaller as well in this embodiment. Also, since the image 11 formed on the imaging surface 9 and interference fringes superposed thereon are free of trapezoidal distortions, whereas the image 11 has substantially the same longitudinal and lateral magnifications with respect to the surface to be inspected 2a, no image processing is necessary, whereby rapid measurement is possible.

Figure 5:
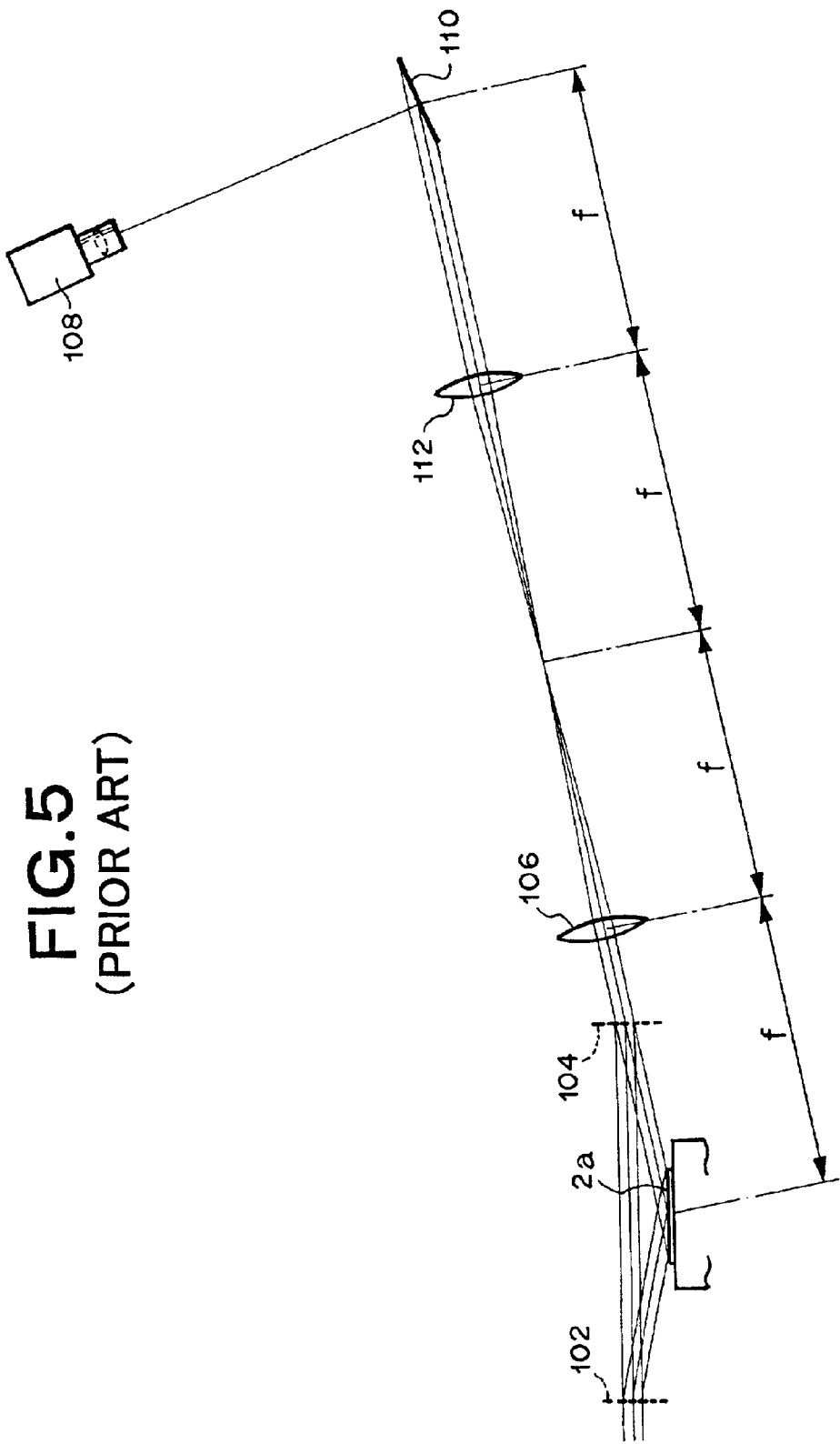
FIG. 5 is a schematic view showing the configuration of a conventional oblique incidence interferometer.

The imaging optical system in accordance with this embodiment will now be compared with the conventional imaging optical system shown in FIG. 5. The lenses 3, 106 on the surface to be inspected side in this embodiment and the conventional imaging optical system have substantially the same size since they are required to cover the diameter of the luminous flux incident thereon. However, the lens space is wider in the case of an imaging optical system in which the lens 112 is made of a lens having the same size as that of the lens 106, as in the conventional example. Further, since the surface to be inspected 2a and the screen 110 are arranged at respective positions conjugate with each other in the conventional example, the image of the surface to be inspected has the same size as that of the surface to be inspected 2a, whereby the screen 110 is required to have a size not smaller than that of the surface to be inspected 2a. By contrast, though the image 10 and its downstream members are depicted considerably greater than the surface to be inspected 2a in FIG. 1 for convenience of explanation, this embodiment can reduce the image 10 to 1/10 or less of the size of the surface to be inspected as in an example which will be explained later. The screen 5 for forming the image 10 can also be made remarkably smaller than that in the conventional example.

The configuration of this embodiment in which the image 10 having interference fringes superposed thereon is formed on the screen 5 by way of a reduction imaging optical system (first imaging optical system) is based on an unconventional idea. Since the image 10 formed on the screen 5 by the reduction imaging optical system has a deformed aspect ratio, the interference fringe image will need image processing if it is captured by a video camera arranged perpendicular to the screen 5 as in conventional configurations, whereby measurement may be hindered from being performed rapidly. This embodiment is configured such that the second imaging optical system is disposed between the screen 5 and the imaging surface 9, such that the image 10 having a deformed aspect ratio is corrected so as to have substantially the same aspect ratio as that of the surface to be measured 2a, and thus corrected image is focused onto the imaging surface 9. Therefore, the captured interference fringe image requires no image processing, whereby rapid measurement is possible.

In order for the second imaging optical system to correct the deformed aspect ratio of the image 10 formed on the screen 5 by the first imaging optical system so as to be reduced from the surface to be inspected 2a, the surface to be inspected 2a and the screen 5 are arranged with respective predetermined angles with respect to the optical axis of the first imaging optical system, whereas the screen 5 and the imaging surface 9 are arranged with respective predetermined angles with respect to the optical axis of the second imaging optical system in the imaging optical system in accordance with this embodiment as mentioned above. Preferably, the imaging optical system of this embodiment is configured so as to satisfy the following conditional expressions (1) to (3). The angular relationships mentioned above can be defined by these conditional expressions (1) to (3):

$$\tan \theta_2 = \beta_1 \tan \theta_1 \tag{1}$$

$$\tan \theta_4 = \beta_2 \tan \theta_3 \tag{2}$$

$$\cos \theta_1 / \cos \theta_2 = \cos \theta_3 / \cos \theta_4 \tag{3}$$

where $\theta_1$ is the angle formed between a normal of the surface to be inspected 2a and the optical axis of the first imaging optical system;

$\theta_2$ is the angle formed between a normal of the screen 5 and the optical axis of the first imaging optical system;

$\theta_3$ is the angle formed between the normal of the screen 5 and the optical axis of the second imaging optical system;

$\theta_4$ is the angle formed between a normal of the imaging surface 9 and the optical axis of the second imaging optical system;

$\beta_1$ is the absolute value of magnification of the first imaging optical system; and $\beta_2$ is the absolute value of magnification of the second imaging optical system.

The above-mentioned conditional expressions (1) to (3) will now be explained with reference to FIGS. 2A and 2B and FIGS. 3A and 3B. FIGS. 2A and 2B are views for explaining the reducing relationship between the surface to be inspected 2a and the image 10 in the first imaging optical system. FIG. 2A is a view showing a part extending from the surface to be inspected 2a to the image 10 on the screen 5 as seen in a direction orthogonal to a plane including a normal of the surface to be inspected 2a and a normal of the screen 5, whereas FIG. 2B is a view showing this part from the upper side of the paper surface of FIG. 2A. FIGS. 3A and 3B are views for explaining the reducing relationship between the image 10 on the screen 5 and the image on the imaging surface 9 in the second imaging optical system. FIG. 3A is a view showing a part extending from image 10 to the image 11 in a direction orthogonal to a plane including a normal of the screen 5 and a normal of the imaging surface 9, whereas FIG. 3B is a view showing this part from the upper side of the paper surface of FIG. 3A.

First, the reducing relationship in the first imaging optical system will be explained with reference to FIGS. 2A and 2B. Since this optical system is an imaging optical system for an oblique incidence interferometer, the surface to be inspected 2a is arranged oblique with respect to the optical axis of this optical system as depicted. In the first imaging optical system, as mentioned above, two telecentric lenses 3, 4 having respective focal lengths different from each other, are arranged afocal to each other. It has been known that, when an object plane arranged oblique with respect to such an imaging optical system is finely focused on an imaging surface, the following relational expressions hold in general:

$$A' = A\beta^2 \tag{4}$$

$$\tan \theta' = \beta \tan \theta \tag{5}$$

$$\omega = \cos \theta / \cos \theta' \tag{6}$$

where

A is (the optical axis direction component of the longitudinal length of the object plane)/2;

A' is (the optical axis direction component of the longitudinal length of the image on the imaging surface)/2;

θ is the angle between a normal of the object plane and the optical axis of the imaging optical system;

θ' is the angle between a normal of the imaging surface and the optical axis of the imaging optical system;

β is the absolute value of magnification of the imaging optical system; and

ω is the ratio of compression of the longitudinal length of the image on the imaging surface.

Here, the ratio of compression of the longitudinal length of the image on the imaging surface refers to the deformed aspect ratio of the image on the imaging surface with respect to the aspect ratio of the object plane occurring only in the direction in which the optical axis extends due to the fact that the object plane and the imaging surface are arranged oblique with respect to the optical axis of the imaging optical system, thereby indicating the ratio of compression of the longitudinal length of the image with respect to the lateral length thereof. Here, the lateral length refers to the length of the imaging surface in a direction, within the imaging surface, orthogonal to a line by which a plane including the optical axis of the imaging optical system and a normal of the imaging surface intersects the imaging surface. In FIG. 2B, for example, it corresponds to the major axis $L_1$ of the ellipse of the image 10. The longitudinal length refers to the length of the imaging surface within a plane including the optical axis of the imaging optical system and a normal of the imaging surface. In FIG. 2A, it corresponds to the minor axis $\omega L_1$ of the ellipse of the image 10.

When this imaging relationship holds in the first imaging optical system of this embodiment, the angles and lengths shown in FIGS. 2A and 2B satisfy the following expressions (4') to (6'):

$$A_2 = A_1 \beta_1^2 \tag{4'}$$

$$\tan \theta_2 = \beta_1 \tan \theta_1 \tag{5'}$$

$$\omega = \cos \theta_1 / \cos \theta_2 \tag{6'}$$

where $A_1$ is (the optical axis direction component of the longitudinal length $L_S$ of the surface to be inspected 2a)/2;

$A_2$ is (the optical axis direction component of the longitudinal length $L_1$ of the image 10)/2;

$\theta_1$ is the angle formed between the normal of the surface to be inspected 2a and the optical axis of the first imaging optical system;

$\theta_2$ is the angle formed between the normal of the screen 5 and the optical axis of the first imaging optical system;

$\beta_1$ is the absolute value of magnification ($L_1/L_S$) of the first imaging optical system; and ω is the ratio of compression of the longitudinal length of the image 10 on the imaging surface.

Here, the above-mentioned $\theta_1$ equals the angle of incidence of the measurement light with respect to the surface to be inspected 2a in this oblique incidence interferometer. Also, as indicated by the above-mentioned expression (5'), the angle $\theta_2$ at which the screen 5 is arranged so as to form the image 10 in focus with respect to the first imaging optical system is a value definitely determined when the incident angle $\theta_1$ of the measurement light with respect to the surface to be inspected 2a and the absolute value $\beta_1$ of magnification of the first imaging optical system are specified. Also, $0 < \theta_1 < 90$ degrees, $0 < \theta_2 < 90$ degrees, and the first imaging optical system is a reducing system presuming $0 < \beta_1 < 1$, whereby $\theta_2 < \theta_1$ from the above-mentioned expression (5').

Thus, as shown in FIGS. 2A and 2B, the surface to be inspected 2a having a circular form with a diameter $L_S$ forms the image 10 on the screen 5, which is reduced into an elliptic form having a length (minor axis) of $\omega L_1$ ($=\omega \beta_1 L_S$) within a plane including the normal of the screen 5 and the optical axis of the first imaging optical system and a length (major axis) of $L_1$ ($=\beta_1 L_S$) orthogonal thereto, while yielding a deformed aspect ratio with respect to the surface to be inspected 2a.

When the imaging relationship mentioned above holds in the second imaging optical system of this embodiment, the angles and lengths shown in FIGS. 3A and 3B satisfy the following expressions (4") to (6"):

$$A_4 = A_3 \beta_2^2 \tag{4"}$$

$$\tan \theta_4 = \beta_2 \tan \theta_3 \tag{5"}$$

$$\omega' = \cos \theta_3 / \cos \theta_4 \tag{6"}$$

where $A_3$ is (the optical axis direction component of the longitudinal length $L_1$ of the image 10)/2;

$A_4$ is (the optical axis direction component of the longitudinal length $L_2$ of the image 11)/2;

$\theta_3$ is the angle formed between the normal of the screen 5 and the optical axis of the second imaging optical system;

$\theta_4$ is the angle formed between the normal of the imaging surface 9 and the optical axis of the second imaging optical system;

$\beta_2$ is the absolute value of magnification ($L_2/\omega L_1$) of the second imaging optical system; and $\omega'$ is the ratio of compression of the longitudinal length of the image 11.

As mentioned above, the second imaging optical system is arranged such that the image 11 is formed on the imaging surface 9 by the second imaging optical system so as to be reduced from the image 10 on the screen 5 while being corrected so as to yield substantially the same aspect ratio with respect to the surface to be inspected 2a. This correction can be carried out such that the elliptic image 10 formed on the screen 5 while being multiplied by the ratio of compression $\omega$ in only one of directions is multiplied by the same ratio of compression $\omega$ in only the direction orthogonal thereto. When the second imaging optical system is arranged such that its optical axis is parallel to a plane including the major axis of the elliptic image on the screen 5 and the normal of the screen 5, only the major axis direction of the elliptic image 10 can be multiplied by the ratio of compression $\omega'$.

When the optical axis of the second imaging optical system is parallel to the above-mentioned plane while the screen surface and the imaging surface are arranged with respective predetermined angles with respect to the optical axis, the image 11 corrected so as to yield substantially the same aspect ratio with respect to the surface to be inspected 2a can be obtained in focus on the imaging surface 9.

Since the ratio of compression $\omega$ shown in (6") equals the ratio of compression $\omega$ in the first imaging optical system as mentioned above, angles $\theta_3$, $\theta_4$ at which the screen 5 and the imaging surface 9 are arranged with respect to the second imaging optical system so as to form the image 11 in focus on the imaging surface can be definitely determined from the above-mentioned expressions (5") and (6") if the absolute value $\beta_2$ of the magnification of the second imaging optical system is specified in addition to $\omega$. As in the first imaging optical system, $0<\theta_3<90$ degrees, $0<\theta_4<90$ degrees, and the second imaging optical system is a reducing system presuming $0<\beta_2<1$, whereby $\theta_4<\theta_3$ from the above-mentioned expression (5").

Thus, as shown in FIGS. 3A and 3B, the elliptic image 10 having a length (major axis) of $L_1$ ($=\beta_1 L_S$) within a plane including the normal of the screen 5 and the optical axis of the second imaging optical system and a length (minor axis) of $\omega L_1$ ($=\omega\beta_1 L_S$) orthogonal thereto is focused as the circular image 11 having a diameter $L_2$ ($=\omega\beta_1\beta_2 L_S$), into which the surface to be inspected 2a is reduced by substantially the same longitudinal and lateral magnifications, on the imaging surface by the second imaging optical system.

Thus, the angular relationship between each surface and the optical axis of each imaging optical system is defined in the imaging optical system of this embodiment, whereby the image 11 into which the surface to be inspected 2a is reduced by the same longitudinal and lateral magnifications is formed in focus on the imaging surface 9. Here, the above-mentioned conditional expressions (1) and (2) are expressions (5') and (5") defining respective imaging relationships in the first and second imaging optical systems, whereas the above-mentioned conditional expression (3) is one defined such that $\omega=\omega'$ as mentioned above from conditional expressions (6') and (6") defining respective imaging relationships in the first and second imaging optical systems.

Preferably, in the imaging optical system of this embodiment, the screen 5 on which the image 10 is formed by the first imaging optical system is constituted by a diffuser rotating with a center of rotation located on the intermediate imaging surface or an extended plane thereof. In FIG. 1, the screen 5 is a diffuser made of a disk-shaped ground glass sheet having a center part 6 to which a shaft of a motor is secured so as to be rotated, while the composite light carrying interference fringe information is made incident on its marginal part at a predetermined position, whereby the image 10 on which interference fringes are superposed is formed thereon.

When the screen 5 constituted by such a rotary diffuser is used, secondary speckles generated from the screen 5 are averaged as if they are not generated, whereby speckle noise superposed on the interference image captured downstream thereof can be reduced. When the conventional imaging optical system is used, the screen 110 having a size not smaller than that of the surface to be inspected 2a is required, which is hard to rotate at a sufficiently high speed with respect to the shutter speed (sampling period). However, the imaging optical system of this embodiment can make the screen 5 smaller, whereby the screen 5 made of such a rotary diffuser can be used.

Suitable as materials for such a screen 5 in this embodiment are those which can generate scattered light, such as a ground glass sheet, a holographic screen, and a liquid crystal screen using a dynamical scattering mode of a liquid crystal. In particular, a holographic screen causing the scattered light emitted therefrom to have directivity as well is desirable from the viewpoint of light quantity gain, whereas a liquid crystal screen utilizing a dynamical scattering mode is desirable from the viewpoint of lowering secondary speckles. In the imaging optical system of this embodiment, the optical axis of the second imaging optical system is arranged oblique with respect to the screen 5, so that the scattered light forms the image 11 on the imaging surface.

When a second screen is disposed at the position of the imaging surface 9 in this embodiment, whereas the image 11 formed on the second screen is captured by a video camera comprising a zoom lens, the image 11 on which interference fringes are superposed can be captured with varied magnifications.

EXAMPLE

In the following, an example of the imaging optical system for an oblique incidence interferometer in accordance with the present invention will be explained with reference to specific values.

In this example, the laser wavelength $\lambda$ of the light source of the oblique incidence interferometer, the fringe sensitivity $\lambda'$ obtained when this light source light is made obliquely incident on the surface to be inspected 2a, the diameter (hereinafter referred to as inspection surface size) $L_S$ of the circular surface to be inspected 2a, and the diameter (hereinafter referred to as imaging surface size) $L_2$ of the circular image 11 on the imaging surface 9 are set as follows:

$\lambda=1.064\ \mu m$ (YAG laser)

$\lambda'=2.0\ \mu m$ $L_S=300$ mm $L_2=2.0$ mm.

When light having the wavelength $\lambda$ is made obliquely incident on the surface to be inspected 2a so as to yield the fringe sensitivity $\lambda'$ according to the setting mentioned above, the angle $\theta_1$ of incidence of the obliquely incident measurement light with respect to the surface to be inspected 2a is defined by the following expression (7):

$$\cos\theta_1 = \lambda/(2\lambda') \quad (7)$$

and is determined as $\theta_1 \approx 74.6°$.

Here, the imaging optical system of this oblique incidence interferometer is an optical system which forms an image of the inspection surface size $L_1$ as the imaging surface size $L_2$, in which the relationship of $L_2=\omega\beta_1\beta_2 L_S$ holds as mentioned above. $L_S$ and $L_2$ are set as mentioned above, whereas $\omega$, $\beta_1$, and $\beta_2$ can be set arbitrarily so as to satisfy a correlation based on the above-mentioned relationship within the range satisfying $0<\omega<1$, $0<\beta_1<1$, and $0<\beta_2<1$ as a condition for a reducing system. However, each of the angles $\theta_1$ to $\theta_4$ defined by them is required to fall within the range greater than 0 but smaller than 90 degrees since they are emission angles or exit angles. Also, it is preferred that the absolute values of imaging magnifications $\beta_1$ and $\beta_2$ be distributed to both of them to a certain extent such that none of them has an extremely small value, whereby the inspection surface size $L_S$, the size $L_1$ of the image of the surface to be inspected on the screen, and the inspection surface size $L_2$ on the imaging surface successively become smaller in this order.

For satisfying such a condition, this example shows a case where the major axis (hereinafter referred to as inspection surface image major axis) $L_1$ of the elliptical image 10 on the screen is set such that $L_1=30$ mm. As mentioned above, the inspection surface image major axis refers to the length of the image 10 in a direction, on the screen surface, orthogonal to a line by which a plane including the optical axis of the first imaging optical system and a normal of the screen intersects the screen surface.

From the values of $L_1$ and $L_S$, $\beta_1=0.1$. According to this $\beta_1$ and the above-mentioned $\theta_1$, the value of $\theta_2$ can be determined as $\theta_2\approx19.9°$ from the above-mentioned conditional expression (1). Also, from these values of $\theta_1$ and $\theta_2$, the ratio of compression $\omega$ in the longitudinal direction of the image 10, which is the left side of the above-mentioned conditional expression (3), is determined as $\omega\approx0.283$.

The second imaging optical system is arranged such that the elliptic image 10 having the major axis $L_1$ and minor axis $\omega L_1$, formed on the screen, is corrected into the circular image 11 having the diameter $L_2$ on the imaging surface 9. The optical axis of the second imaging optical system exists within a plane parallel to a plane including a normal of the screen and the major axis $L_1$ of the image 10. Since the ratio of longitudinal compression $\omega'$ caused by the second imaging optical system equals $\omega$, $\beta_2\approx0.236$ can be determined from $\beta_2=L_2/(\omega L_1)$. Also, since the right side of the above-mentioned conditional expression (3) equals $\omega$, $\theta_3\approx80.7°$ and $\theta_4\approx55.3°$ can be determined from $\omega=\cos\theta_3/\cos\theta_4$ and the above-mentioned conditional expression (2). The values concerning the example mentioned above are listed in the following:

Laser wavelength $\lambda$: 1.064 $\mu$m (YAG laser)

Inspection surface diameter $L_S$: 300 mm

Measurement sensitivity $\lambda'$: 2 $\mu$m

Angle $\theta_1$ formed between the surface to be inspected and the optical axis of the first imaging optical system: 74.6 degrees Ratio $\omega$ of compression of longitudinal length of image 10: 0.283

Angle $\theta_3$ formed between the normal of screen and the optical axis of the first imaging optical system: 19.9 degrees Inspection surface image major axis $L_1$ on screen: 30 mm Angle $\theta_3$ formed between the normal of screen and the optical axis of the second imaging optical system: 80.7 degrees Ratio $\omega'$ of compression of longitudinal length of image 11: 0.283

Angle $\theta_4$ formed between the normal of screen and the optical axis of the second imaging optical system: 55.3 degrees Inspection surface image size $L_2$ on imaging surface: 2 mm.

As indicated as the example in the foregoing, $L_1$, $\theta_2$, $\theta_3$, and $\theta_4$ can be selected arbitrarily with a correlation therebetween in the imaging optical system of the present invention when values of $\theta_1$, $L_S$, and $L_2$ are set. In actual designing, an appropriate configuration may be chosen in view of conditions such as the size of screen 5 appropriate to the inspection surface image major axis $L_1$, respective positions where individual members are disposed, and the like.

Without being restricted to the above-mentioned example, the imaging optical system for an oblique incidence interferometer in accordance with the present invention can be modified in various manners. For example, the values of $\lambda$, $\lambda'$, $L_S$, and $L_2$ which are fixed in the above-mentioned example may be set arbitrarily without being restricted to those in the example. Also, though the case where the surface to be inspected is circular is explained as a typical form, the present invention is applicable to other forms of surface to be inspected as a matter of course.

Also, the imaging optical system for an oblique incidence interferometer in accordance with the present invention does not restrict the configuration of the wavefront splitting means (or luminous flux splitting means) and wavefront combining means (or luminous flux combining means) upstream thereof in particular. It is also favorable as an imaging optical system of an oblique incidence interferometer using a half mirror and a half prism, for example, as these means, as a matter of course. Also, the oblique incidence interferometer may be configured such that measurement light is reflected by a surface to be inspected whereas reference light is reflected by a reference surface.

Though the second imaging optical system is arranged in the imaging optical system for an oblique incidence interferometer in accordance with the present invention such that an image of the surface to be inspected caused by scattered light transmitted through a screen is formed on an imaging surface, it is not restrictive. The second imaging optical system may be configured such that an image of the surface to be inspected caused by the scattered light reflected by the screen is formed on the imaging surface by the second imaging optical system.

Also, the number and form of telecentric lenses constituting the first and second imaging optical systems in the imaging optical system for an oblique incidence interferometer in accordance with the present invention are not restricted to those mentioned above.

In the imaging optical system for an oblique incidence interferometer in accordance with the present invention, as explained in the foregoing, a surface to be inspected, a first imaging optical system composed of two telecentric lens groups, an intermediate imaging surface, a second imaging optical system composed of two telecentric lens groups, and an imaging surface have such a positional relationship therebetween that a first image of the surface to be inspected, reduced from the surface to be inspected, having a deformed aspect ratio with respect to the surface to be inspected is formed on the intermediate imaging surface, and then is focused onto the imaging surface as a second image of the surface to be inspected, which is reduced from the first image and corrected so as to have substantially the same aspect ratio with respect to the surface to be inspected. Therefore, the image of the surface to be inspected formed on the imaging surface and interference fringes formed thereon become an image reduced by substantially the same longitudinal and lateral magnifications with respect to the surface to be inspected. Also, since the first imaging optical system is a reducing system, the screen to become an intermediate imaging surface can be made smaller, whereby the imaging optical system extending from the surface to be inspected to the imaging surface can be made smaller.

What is claimed is:

1. An imaging optical system for an oblique incidence interferometer in which a part of light source light is turned into parallel light so as to become measurement light obliquely incident on a surface to be inspected in a sample, a part of the remainder of said light source light is used as reference light constituted by parallel light, and said measurement light and said reference light are combined together and caused to interfere with each other so as to superpose interference fringes onto an image of said surface to be inspected formed on an imaging surface;

said imaging optical system comprising:

a first imaging optical system comprising two groups of telecentric lenses $G_1$, $G_2$ having respective focal lengths different from each other, said telecentric lens $G_1$ having a longer focal length and said telecentric lens $G_2$ having a shorter focal length being arranged afocal to each other successively from said surface to be inspected side;

an intermediate imaging surface; and a second imaging optical system comprising two groups of telecentric lenses $G_3$, $G_4$ having respective focal lengths different from each other, said telecentric lens $G_3$ having a longer focal length and said telecentric lens $G_4$ having a shorter focal length being arranged afocal to each other successively from said surface to be inspected side;

wherein a first image of said surface to be inspected, reduced from said surface to be inspected, having a deformed aspect ratio with respect to said surface to be inspected is formed on said intermediate imaging surface by said combined light of said measurement light and reference light by way of said first imaging optical system; and wherein said second imaging optical system is arranged with respect to said intermediate imaging surface such that said first image of said surface to be inspected is focused by said second imaging optical system onto said imaging surface as a second image of said surface to be inspected which is reduced from said first image of said surface to be inspected and corrected so as to have substantially the same aspect ratio as that of said surface to be inspected.

2. An imaging optical system according to claim 1, wherein said second imaging optical system forms on said imaging surface an image of said surface to be inspected caused by scattered light transmitted through said intermediate imaging surface.

3. An imaging optical system according to claim 1, wherein said second imaging optical system forms on said imaging surface an image of said surface to be inspected caused by scattered light reflected by said intermediate imaging surface.

4. An imaging optical system according to claim 1, wherein said imaging optical system satisfies the following conditional expressions (1) to (3):

$$\tan \theta_2 = \beta_1 \tan \theta_1 \quad (1)$$

$$\tan \theta_4 = \beta_2 \tan \theta_3 \quad (2)$$

$$\cos \theta_1 / \cos \theta_2 = \cos \theta_4 \quad (3)$$

where $\theta_1$ is the angle formed between a normal of the surface to be inspected and the optical axis of the first imaging optical system;

$\theta_2$ is the angle formed between a normal of the intermediate imaging surface and the optical axis of the first imaging optical system;

$\theta_3$ is the angle formed between the normal of the intermediate imaging surface and the optical axis of the second imaging optical system;

$\theta_4$ is the angle formed between a normal of the imaging surface and the optical axis of the second imaging optical system;

$\beta_1$ is the absolute value of magnification of the first imaging optical system; and $\beta_2$ is the absolute value of magnification of the second imaging optical system.

5. An imaging optical system according to claim 1, wherein said intermediate imaging surface is constituted by a diffuser rotating with a center of rotation located on said intermediate imaging surface or an extended plane thereof.

6. An imaging optical system according to claim 5, wherein said diffuser comprises at least one member selected from the group consisting of a ground glass sheet, a holographic screen, and a liquid crystal screen using a dynamical scattering mode.

* * * * *

UNITED STATES PATENT AND TRADEMARK OFFICE
CERTIFICATE OF CORRECTION

PATENT NO. : 6,744,523 B2
DATED : June 1, 2004
INVENTOR(S) : Nobuaki Ueki and Hideo Kanda It is certified that error appears in the above-identified patent and that said Letters Patent is hereby corrected as shown below:

Column 14,
Line 20, delete "$\cos \theta_1/\cos \theta_2 = \cos \theta_4$" and substitute therefore
-- $\cos \theta_1/\cos \theta_2 = \cos \theta_3/\cos \theta_4$ --

Signed and Sealed this

Twenty-ninth Day of March, 2005

JON W. DUDAS
*Director of the United States Patent and Trademark Office*